Patented Nov. 16, 1926.

1,607,462

UNITED STATES PATENT OFFICE.

FERDINAND KELLER AND KARL SCHNITZSPAHN, OF OFFENBACH-ON-THE-MAIN, GERMANY, ASSIGNORS TO GRASSELLI DYESTUFF CORPORATION, OF NEW YORK, N. Y., A CORPORATION OF DELAWARE.

DRY DIAZO COMPOSITION.

No Drawing. Application filed January 20, 1926, Serial No. 82,580, and in Germany January 30, 1925.

This invention relates to dry diazo compositions which consist of mixtures of diazocompounds separated in a solid form with partially dehydrated aluminum sulfate compounds.

Diazocompounds are ordinarily prepared by precipitation from solution and subsequent filtration. As prepared in this manner, the diazocompounds are obtained in a moist condition. The drying of such diazocompounds, as for example, diazosalts, diazo oxides, diazosulfo acids, by evaporation of their water content by heating is, as is well known, attendant with some danger in many cases. and is always a bothersome operation. Therefore, a process of drying such diazocompounds without the use of heat and their conversion into dry stable compounds in a form in which they are useful for dyeing, is of great importance.

We have discovered that such a process can be carried out by mixing partially dehydrated aluminum sulfate compounds with moist diazocompounds.

By the term partially dehydrated aluminum sulfate compounds is to be understood partially dehydrated alum and partially dehydrated aluminum sulfate. By partially dehydrated alum is to be understood such as has given off up to 4/5 of its water of crystallization. By partially dehydrated aluminum sulfate is to be understood such as has given off up to 3/4 of its water of crystallization, and which still contains about 1/4 of such water content. The most suitable partially dehydrated alum is one which contains about 8 molecules of water of crystallization out of 24 molecules, and the most suitable partially dehydrated aluminum sulfate is one which contains about 9 molecules of water of crystallization out of 18 molecules. Such partially dehydrated alum and aluminum sulfate take up the water from moist diazocompounds with which they are mixed very quickly, and without any dangerous or too high rise in temperature. In this manner, compositions are obtained which quickly become completely dry and which possess a high stability in moist air, and which dissolve quickly and easily in cold or slightly warm water. On the other hand, dried diazo compositions of equally good properties, especially stability in warm storage and solubility in cold water or water which has been heated to about 35° C. are not obtained by mixing moist diazo salts with anhydrous sodium sulfate, nor with anhydrous magnesium sulfate, nor with burnt alum, nor with any other anhydrous salt. Burnt alum is recommended in German Patent 85,387 for the purpose of converting into a dry powdered condition solutions of easily soluble diazo-sulfates which contain free sulfuric acid and which have been evaporated to a syrup consistency. However, dry compositions cannot be quickly obtained with burnt alum from moist diazocompounds which do not contain a considerable amount of free mineral acid. Also, such compositions are not easily soluble in cold water since burnt alum takes up the moisture too slowly and since it is too incompletely and too slowly soluble in cold water. On the other hand, crystallized alum containing its full content of 24 molecules of water of crystallization is not capable of taking up any moisture and not capable of converting moist diazocompounds into a dry form. The desired result of producing diazo compositions of good solubility and which dry quickly is obtained only with partially dehydrated alum.

Partially dehydrated aluminum sulfate is even more suitable than partially dehydrated alum for the purpose desired since it has the advantage over the alum of taking up moisture more quickly, of being more easily soluble and of not increasing greatly in volume by the taking up of water. Likewise, in the case of aluminum sulfate, the desired result is not obtained with a product which contains a full amount of water of crystallization, nor with a completely dehydrated product.

Just as when mixed with moist diazo compounds, so also when mixed with dry diazocompounds, partially dehydrated alum and partially dehydrated aluminum sulfate present advantages over the completely dehydrated products and over those which contain a full amount of water of crystallization since the partially dehydrated aluminum- and potassium- aluminum sulfates are capable of being pulverized with considerably greater ease and are capable of mixing homogeneously with diazocompounds with greater ease than those products which contain a full amount of water of crystallization and since in this case also, only the partially dehydrated compounds are capable of protecting compositions produced with them from the moisture of the air without lessening their solubility in cold water.

In all cases, besides the partially dehydrated alum and aluminum sulfate, still other substances and materials which aid in dyeing may be added to the diazocompounds.

The most important products are those obtained with the negatively substituted diazocompounds, and especially with nitrated diazocompounds.

The invention is illustrated by the following examples:

*Example 1.*

100 parts of centrifuged moist zinc chloride double salt of 4-chlor-2-nitro-diazobenzol of a 38% chlornitroaniline content are ground with 120 parts of partially dehydrated aluminum sulfate of 130% aluminum sulfate content calculated on a molecular weight of 667, and during this time the temperature is prevented from rising above 50° C. by suitable cooling. An entirely dry, easily soluble and very stable composition is quickly obtained. A part of the partially dehydrated aluminum sulfate can be replaced by the dry sodium salt of naphthalenetetrasulfoacid or some other suitable diluting material.

The zinc chloride double salt is obtained by treating a sufficiently concentrated mineral acid diazo solution with zinc chloride and sodium chloride.

By the same process, dry stable diazo compositions can also be prepared from moist diazopicramine acid or diazosulfanilic acid.

*Example 2.*

100 parts of centrifuged moist zinc chloride double salt of diazotized o-nitraniline of 41% o-nitraniline base content are ground with 100 parts of partially dehydrated alum, of 144% content calculated on a molecular weight of 949, and which still contains about 8 molecules of water of crystallization. By suitable cooling, the temperature is prevented from rising above 50° C. A dust dry, bright, very soluble and very stable composition is obtained.

*Example 3.*

245 parts of dry, acid 1.5 naphthalenedisulfo acid salt of diazotized 2-nitro-4-amino-1-toluol of a 31% nitro-toluidine content, obtained by treating the mineral acid diazo solution with free 1.5 naphthalenedisulfo acid, is ground with a mixture of 35 parts of calcined sodium carbonate and 100 parts of partially dehydrated aluminum sulfate which contains 130% of aluminum sulfate calculated on a molecular weight of 667. A very stable and very soluble composition is obtained in which the sodium carbonate reacts with the acid diazonium salt or the aluminum sulfate only on solution in water.

We claim:

1. Dry diazo compositions comprising mixtures of diazocompounds in a solid form with partially dehydrated aluminum sulfate compounds.

2. Dry diazo compositions comprising mixtures of diazocompounds in a solid form with partially dehydrated aluminum sulfate.

3. Dry diazo compositions comprising mixtures of moist diazocompounds in a solid form with partially dehydrated aluminum sulfate.

4. Dry diazo compositions comprising mixtures of moist diazo salts in a solid form with partially dehydrated aluminum sulfate.

5. Dry diazo compositions comprising mixtures of negatively substituted diazo salts in a solid form with partially dehydrated aluminum sulfate.

6. Dry diazo compositions comprising mixtures of nitrated diazo salts in a solid form with partially dehydrated aluminum sulfate.

In testimony whereof, we affix our signatures.

FERDINAND KELLER.
KARL SCHNITZSPAHN.